United States Patent [19]

Williams

[11] Patent Number: 4,736,727
[45] Date of Patent: Apr. 12, 1988

[54] HIGHWAY TRUCK WITH CHARGE AIR COOLING

[75] Inventor: J. Larry Williams, Ft. Wayne, Ind.

[73] Assignee: Navistar International Transportation Corp., Chicago, Ill.

[21] Appl. No.: 880,751

[22] Filed: Jul. 1, 1986

[51] Int. Cl.⁴ ............................................. F02B 29/04
[52] U.S. Cl. ................................ 123/563; 123/41.31; 165/51
[58] Field of Search ............... 60/599; 123/41.31, 563; 165/41, 51; 180/68.1, 68.2

[56] References Cited

U.S. PATENT DOCUMENTS

| | | | |
|---|---|---|---|
| 1,916,549 | 7/1933 | Young | 165/148 X |
| 3,921,603 | 11/1975 | Bentz et al. | 165/51 X |
| 4,137,982 | 2/1979 | Crews et al. | 180/68.1 |
| 4,176,630 | 12/1979 | Elmer | 123/41.12 |
| 4,505,348 | 3/1985 | Gadefelt et al. | 123/563 X |

FOREIGN PATENT DOCUMENTS

| | | | |
|---|---|---|---|
| 226076 | 12/1924 | United Kingdom | 123/563 |
| 253419 | 6/1926 | United Kingdom | 123/563 |
| 1017156 | 1/1966 | United Kingdom | 60/599 |

OTHER PUBLICATIONS

"2300 Tractor", DAF Trucks, Oct. 1980.
"2800 Turbo Intercooling", DAF Trucks, Oct. 1980.
"Underfloor Engined Trucks", MAN, Apr. 1981.
"Fuel Economy", Volvo, Jan. 1981.
SAE Paper No. 851473, "The Influence of Vehicle Installation in the Design of Chassis Mounted Coolers", Agee, Aug. 1985.
"Econodyne Engines", Mack Trucks, Inc., Nov. 1984.
"Chassis Mounted Charge Air Cooling", Mack Trucks, Inc., Dec. 1983.
"Modine Radiators", Modine Company, Aug. 1982.
SAE Paper No. 790770, "Air-to-Air Charge Air Cooling for Truck Engines", Haggh et al., Aug. 1979.
SAE Paper No. 810341, "Turbocharging a 6-Cylinder Diesel for Various Ratings and Applications", McIntosh et al., Feb. 1981.
SAE Paper No. 830379, "Development of a Higher Boost Turbocharged Diesel Engine for Better Fuel Economy in Heavy Vehicles", Suzuki et al., Feb. 1983.
SAE Paper No. 840352, "An Application of a Combined Charging System on a Turbocharged Diesel Engine", Lee et al., Feb. 1984.

Primary Examiner—Michael Koczo
Attorney, Agent, or Firm—F. David Aubuchon; Dennis K. Sullivan

[57] ABSTRACT

A highway truck having a mobile frame and an engine compartment having a forward facing air inlet at the front of the frame disposed to receive ram air from the travel of the truck, a radiator mounted on the frame adjacent the air inlet, and a charge air cooler mounted adjacently above the radiator and adjacent the engine compartment air inlet for parallel ambient air flow therethrough. The air manifolds or plenums of the cross flow charge air cooler preferably have vertically centered rearwardly facing openings to eliminate bends in the ducts connecting to the engine while providing an optimum manifold design.

3 Claims, 2 Drawing Sheets

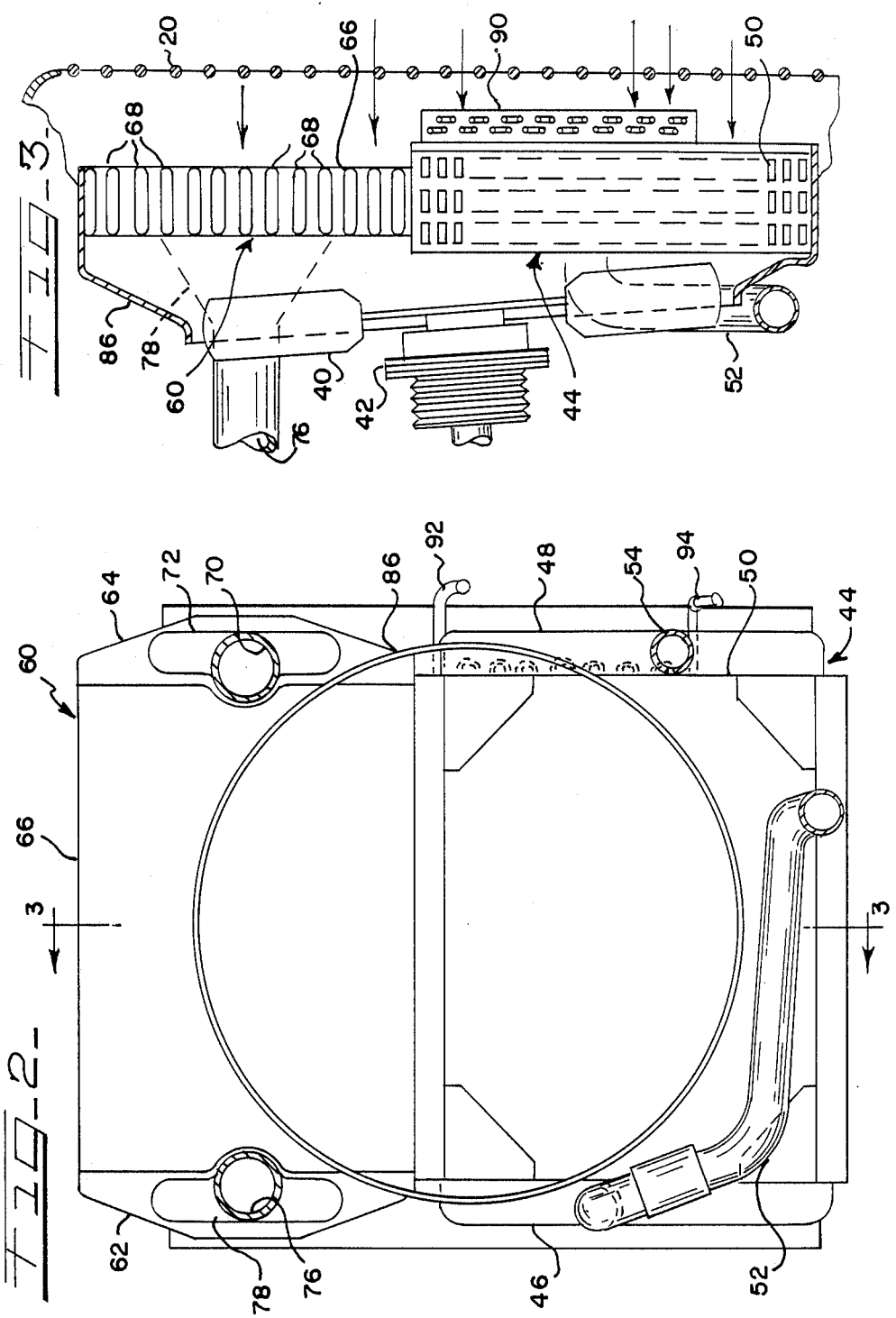

HIGHWAY TRUCK WITH CHARGE AIR COOLING

This invention relates to cooling systems for highway trucks, and more particularly, to a novel arrangement of the radiator and charge air heat exchanger in a highway truck engine compartment wherein the heat exchangers are vertically stacked in the space previously occupied by the radiator alone while providing the same degree of cooling.

THE PRIOR AIR

Turbocharged engines for highway trucks have had cooling of the intake air charge for many years. This usually was accomplished by an intercooler, an intake air-to-engine coolant heat exchanger mounted on the engine, and was quite beneficial in improving engine efficiency and reducing structural loading from cylinder pressure. However, intercooling added substantially to the heat rejected to the engine coolant. Subsequently, ambient air-to-charge air coolers were developed which had the effect, not only of rejecting to atmosphere the heat removed from the charge air, thereby reducing the heat load on the radiator by as much as 30 percent, but also of dramatically lowering the charge air temperature from the 200° F. range to the 130° F. range resulting in still greater engine efficiency.

Various arrangements have been used in installing these charge air coolers on highway trucks along with the radiator and the condenser for the operator's cab air conditioning system. One arrangement of these components provides the condenser in front of the charge air cooler which in turn is in front of the radiator. In another commercially available embodiment, the charge air cooler is disposed above the condenser and both are in front of the radiator. Because the charge air cooler requires a lower ambient air temperature than the radiator, it is located in front of the radiator. In addition to using up another four inches of space in a generally crowded engine compartment, this location also introduces plumbing problems which have special importance because the length and number of bends, especially 90° turns, in the charge air ducts, increases the pressure drop between the compressor and the intake manifold. Leakage at joints, the potential for which increases with increasing numbers of joints, also contributes to a larger pressure drop. Minimizing this pressure drop is very important to the efficiency of the engine.

Moreover, a significant cooling effect in highway trucks is due to the ram air resulting from high speed travel. The above-mentioned series arrangements of the radiator and charge air cooler increases the restriction to ram air and thus increases usage of the fan clutch as well as the parasitic loads on the engine due to usage of the fan. Additionally, the series arrangements result in a less efficient radiator because the temperature of the ambient air entering the radiator has been increased by the charge air cooler.

SUMMARY OF THE INVENTION

This invention solves the above-mentioned problems in its provision of a vertically stacked arrangement of the charge air cooler and radiator within the engine compartment and of providing parallel ambient air flow therethrough. Although it appears impossible to use the present invention and still get the same amount of cooling given the space limitations of the engine compartment in highway trucks, especially in conventional trucks with the current trend toward lower noses for improved aerodynamics and visibility, both the charge air cooler and the radiator operate more efficiently in the arrangement of the present invention to the point that both will occupy approximately the same space previously occupied by the radiator core alone. In addition to the functional improvements, the size reduction of the cores reduces the cost thereof by as much as 25 percent.

Disposing the charge air cooler on top of the radiator further simplifies the piping thereto by providing short direct rearward extending connections from the manifolds or plenums adjacent the charge air cooler core and permit centering the manifold inlet/outlet between the top and bottom of the core to provide uniform distribution of the charge air across the core. Reducing the restriction to ambient air flow across both the charge air cooler and the radiator further results in more efficient use of ram air for supplying the cooling needs of the truck and reduces the amount of time when the clutched fan is in use to the 5-10 percent range from the 10-15 percent range thereby reducing the parasitic fan load on the engine as well as wear and tear on the clutch assembly. Additionally, about four inches of space in the engine compartment in front of the radiator is freed up for other uses or for elimination for styling or aerodynamic purposes.

The foregoing advantages are specifically provided in a highway truck having a mobile frame and an engine compartment having a forward facing air inlet at the front of the frame disposed to receive ram air from the travel of the truck, a radiator mounted on the frame adjacent the air inlet, and a charge air cooler mounted adjacently above the radiator and adjacent the engine compartment air inlet for parallel ambient air flow therethrough. The air manifolds or plenums of the cross flow charge air cooler preferably have vertically centered rearwardly facing openings to eliminate bends in the ducts connecting to the engine while providing an optimum manifold design. An air conditioning condenser may be installed forwardly of the radiator.

DETAILED DESCRIPTION OF THE DRAWINGS

Other objects and advantages of Applicant's invention will become more apparent upon reading the detailed description thereof and upon reference to the drawings in which:

FIG. 2 is a sectional view of the truck of FIG. 1 taken along the line 2—2 thereof rearwardly of the heat exchangers and forwardly of the engine facing forward;

FIG. 3 is a sectional elevation of the heat exchangers taken along the line 3—3 of FIG. 2; and, FIG. 4 is a top view of the heat exchangers and connecting hoses of the highway truck of FIG. 1.

DETAILED DESCRIPTION OF THE PREFERRED EMBODIMENT

Figure 1:
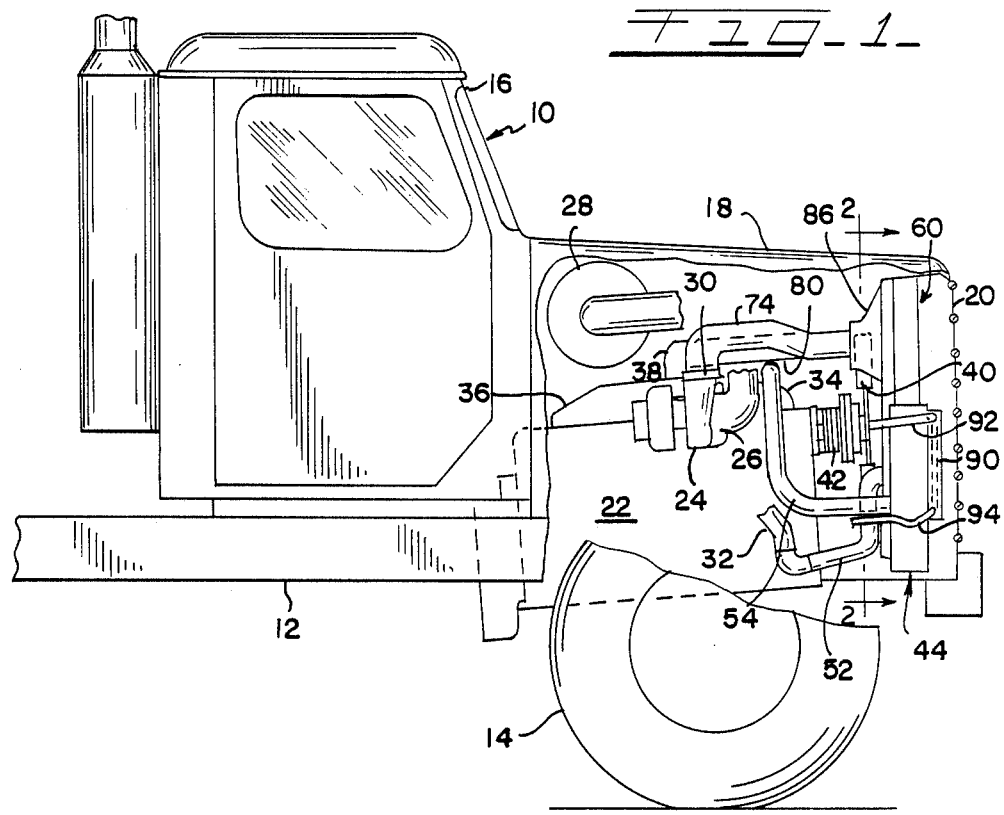
FIG. 1 is a right side elevational view, partially cut away, of the engine compartment of a highway truck incorporating the present invention.

Referring now to FIG. 1, there is shown a highway truck generally designated 10 having a mobile main frame 12 supported and driven by wheels, one of which is shown at 14, in a conventional manner. The truck 10 further has an operator's compartment 16 mounted midway on the frame 12 and an engine compartment 18 mounted forwardly of the operator's compartment 16 in the main direction of travel which has a forwardly facing air inlet 20 extending over most of its front face. Within the engine compartment 18, there is mounted to the mobile frame 12 a turbocharged diesel internal combustion engine 22 including a turbocharger 24 having a compressor section with an air inlet 26 which receives ambient air from air cleaner 28 and a compressed air outlet 30. The engine 22 is further provided with a water pump or engine coolant inlet 32 and an engine coolant outlet 34 as well as a charge air intake manifold 36 having an inlet at 38. The engine is further equipped with a fan 40 connected to and conventionally driven through an intermediate coolant temperature responsive clutch 42 from the front end of the engine.

A radiator assembly 44 is mounted by conventional means to the frame 12 forwardly of the engine adjacent the air inlet 20 of the engine compartment 18. The cross-flow radiator assembly 44 includes side tanks 46 and 48 surrounding a conventional tube and fin core 50. The side tanks 46 and 48 of the radiator core have rearwardly facing openings to which water outlet hose 52 extending to the engine water inlet 32 and inlet hose 54 extending to the engine water outlet 34 are respectively connected.

Charge air cooler asssembly 60 is mounted vertically adjacently above the radiator assembly 44 also adjacent the air inlet 20 of engine compartment 18. The cross-flow charge air cooler 60 comprises a pair of manifolds or plenums 62 and 64 mounted adjacent the ends of core 66 for fluid communication with the charge air tubes 68 extending transversely across the core 66. The charge air cooler inlet manifold 64 has a vertically centered rearwardy facing opening 70 connected by a fore-and-aft extending tapered transition section 72 to the main body of the manifold to provide charge air uniform distribution across the core with the minimum pressure drop. The rearwardly facing manifold opening 70 is connected to the turbocharger compressor air oulet 30 by duct 74 which is nearly straight except for the 90° turn at the engine due to the position of the compressor outlet. The charge air outlet manifold 62 similarly has a rearwardly facing vertically centered opening 76 connected thereto by transition section 78. By use of the transition sections 70, 78, the duct area is increased thereby decreasing the air velocity before the charge air turns in the manifold to traverse the core. With lower velocity, the pressure drop due to the turn becomes less. The rearwardly facing outlet opening 76 is connected by duct 80 to the intake manifold inlet 38. Again, duct 80 is practically straight except for the 90° bend at the engine intake manifold due to the engine design. As best shown in FIG. 3, a shroud 86 is disposed about both the charge air cooler 60 and the radiator 44 to direct ambient air passing through either to the fan 40.

An air conditioning condenser 90 is disposed forwardly of a portion of the radiator 44 and contains inlet and outlet tubes 92 and 94 connected respectively to the compressor and evaporator of the cab air conditioning in a conventional manner.

It will be seen from an examination of FIG. 3 that ambient air flow entering the engine compartment through inlet 20 as ram air caused by the forward travel of the vehicle will flow parallelly through both the charge air cooler 60 as well as the radiator 44 as illustrated by the arrows, the ram air first passing through the air conditioning condenser 90 before entering the radiator core. Air drawn through the radiator and charge air cooler by the fan 40 when it is operative may not be uniformly distributed across the cores but this will usually not be a problem in a highway truck because the fan normally operates at low road speed when the charge air temperature is low and needs little cooling. Since the radiator is not behind the charge air cooler, there will be substantially less restriction and more ambient air flow across the charge air cooler making it more efficient. Similarly, other than the small amount which the condenser may increase the ambient air temperature, the radiator assembly 44 will experience a low ambient air inlet temperature because the charge air cooler is not forward of it, and thus be more efficient. It turns out that because both the charge air cooler and the radiator are made more efficient by the inventive arrangement, the two heat exchangers occupy the same space formerly occupied by the radiator alone resulting in a total core area reduction on the order of 30 percent.

Figure 4:
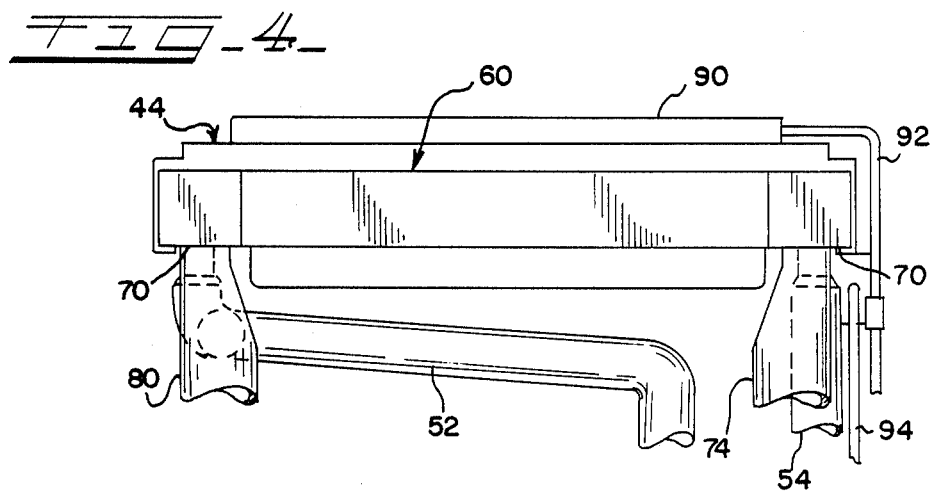

It can be seen from viewing the drawings especially FIGS. 1, 2 and 4 that the piping between the engine and the three heat exchangers is vastly simplified by the disposition of the charge air cooler above the radiator because there is no need to route the charge air ducts around the radiator.

Thus, there has been taught in accordance with the invention, a highway truck with charge air cooler which fully satisfies the objects, aims and advantages set forth above. Although the invention has been described in conjunction with a single embodiment thereof, it will be apparent to those of ordinary skill in the art that modifications and alterations of the invention can be made without departing from the true scope of the invention as defined in the appended claims.

What is claimed is:

1. A highway truck comprising:
a mobile frame capable of being driven at speeds generating a significant ram air effect;
an engine compartment mounted at the forward end of said frame and having a forwardly facing ambient air inlet disposed to receive ram air resulting from the forward travel of said trick at highway speeds;
an engine mounted to said frame within said engine compartment, said engine including a charge air compressor having an air outlet, an intake manifold for receiving said charge air, a coolant inlet, a coolant outlet, and a cooling fan for drawing ambient air into said engine compartment through said ambient air inlet therein;
an ambient-air-to-coolant heat exchanger fluidly disposed between said engine coolant inlet and said engine coolant outlet and operatively mounted to said mobile frame within said engine compartment, said heat exchanger having its ambient air passages disposed adjacent to said engine compartment inlet for receiving ambient air therethrough;
an ambient-air-to-charge-air heat exchanger fluidly disposed between said charge air compressor and said intake manifold and operatively mounted within said engine compartment in vertically abutting alignment with said coolant heat exchanger, said charge air heat exchanger having its ambient air passages disposed adjacent to said engine compartment inlet for receiving ambient air therethrough, the ambient air flow paths through said coolant heat exchanger and said charge air heat exchanger being parallel; and a single fan shroud disposed about said fan and enclosing the space between said fan and both of said heat exchangers and channelling air drawn through both heat exchangers to said fan.

2. The invention in accordance with claim 1 and said charge air heat exchanger comprising a core operatively disposed between inlet and outlet manifolds, each of said manifolds having a vertically centered rearwardly facing opening disposed for fluid connection respectively to said compressor outlet and said intake manifold of said engine.

3. The invention in accordance with claim 2 and said charge air core manifolds having a rearwardly extending tapered transition section connecting the main body of said manifold with said rearwardly facing outlet.

* * * * *